(12) United States Patent
Toma et al.

(10) Patent No.: US 9,203,852 B2
(45) Date of Patent: *Dec. 1, 2015

(54) DOCUMENT CLASSIFICATION USING MULTISCALE TEXT FINGERPRINTS

(71) Applicant: Bitdefender IPR Management Ltd., Nicosia (CY)

(72) Inventors: Adrian Toma, Iasi (RO); Marius Tibeica, Iasi (RO)

(73) Assignee: Bitdefender IPR Management Ltd., Nicosia (CY)

( * ) Notice: Subject to any disclaimer, the term of this patent is extended or adjusted under 35 U.S.C. 154(b) by 0 days.

This patent is subject to a terminal disclaimer.

(21) Appl. No.: 14/558,079

(22) Filed: Dec. 2, 2014

(65) Prior Publication Data
US 2015/0089644 A1 Mar. 26, 2015

Related U.S. Application Data

(63) Continuation of application No. 13/790,636, filed on Mar. 8, 2013, now Pat. No. 8,935,783.

(51) Int. Cl.
H04L 29/06 (2006.01)
H04L 12/58 (2006.01)
G06Q 50/26 (2012.01)

(52) U.S. Cl.
CPC .......... H04L 63/1408 (2013.01); G06Q 50/265 (2013.01); H04L 51/12 (2013.01)

(58) Field of Classification Search
CPC ..... H04L 63/14; H04L 9/3244; H04L 9/3236; H04L 9/32; G06F 21/564; G06F 21/562
See application file for complete search history.

(56) References Cited

U.S. PATENT DOCUMENTS

2005/0132197 A1* 6/2005 Medlar .................. 713/176

* cited by examiner

*Primary Examiner* — Izunna Okeke
(74) *Attorney, Agent, or Firm* — Law Office of Andrei D Popovici, PC

(57) ABSTRACT

Described systems and methods allow a classification of electronic documents such as email messages and HTML documents, according to a document-specific text fingerprint. The text fingerprint is calculated for a text block of each target document, and comprises a sequence of characters determined according to a plurality of text tokens of the respective text block. In some embodiments, the length of the text fingerprint is forced within a pre-determined range of lengths (e.g. between 129 and 256 characters) irrespective of the length of the text block, by zooming in for short text blocks, and zooming out for long ones. Classification may include, for instance, determining whether an electronic document represents unsolicited communication (spam) or online fraud such as phishing.

22 Claims, 11 Drawing Sheets

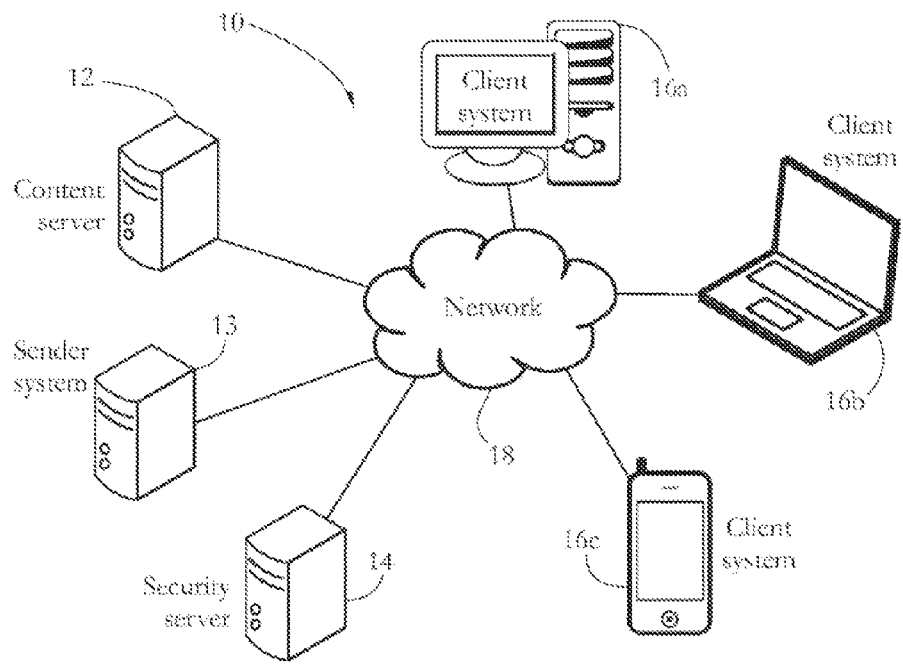
FIG. 1
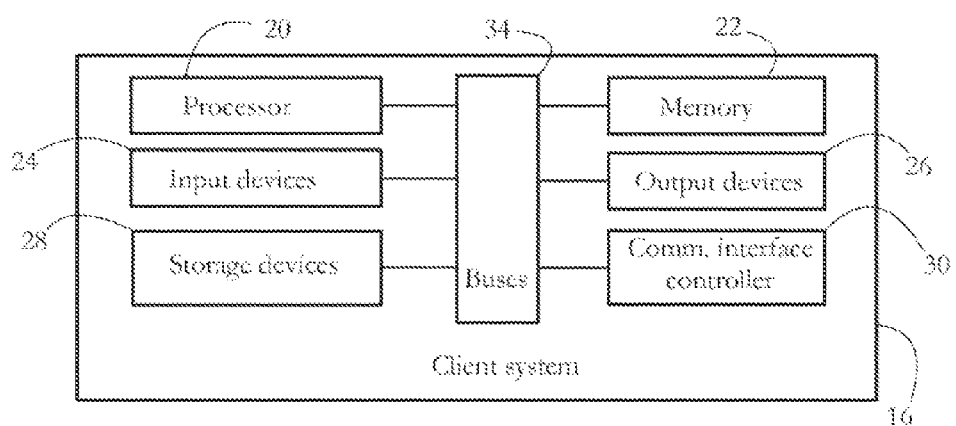
FIG. 2-A

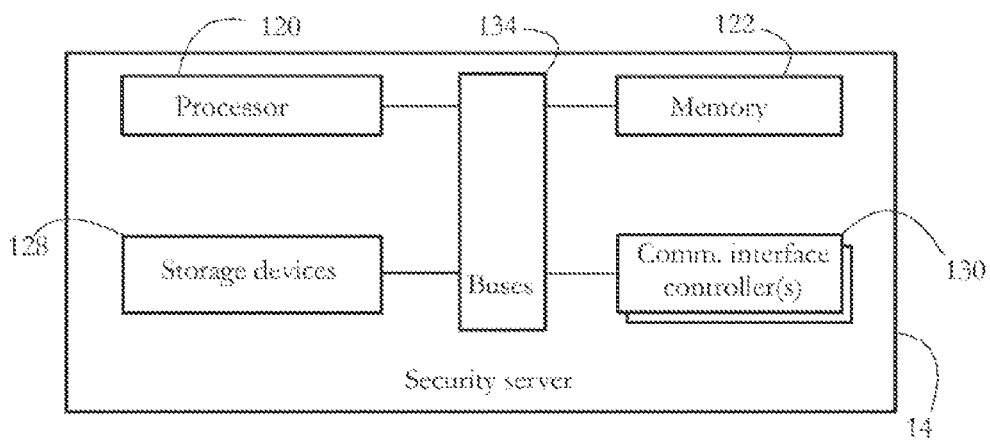
FIG. 2-B
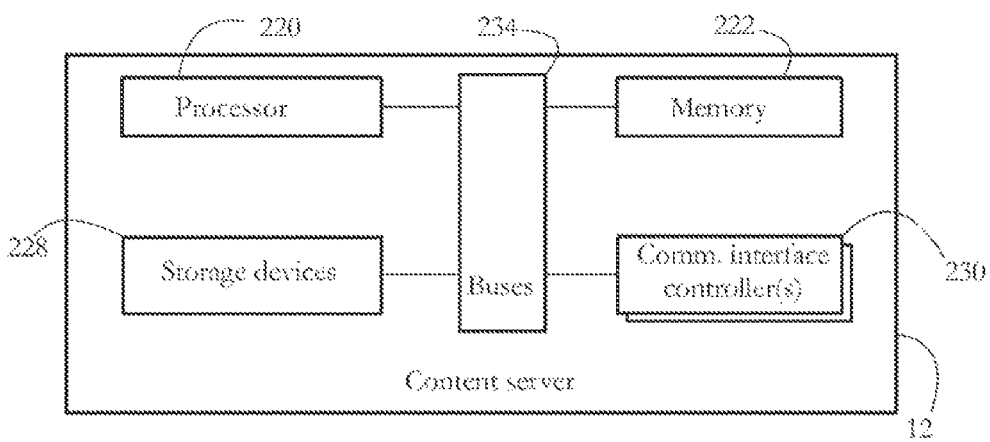
FIG. 2-C

FIG. 3-A
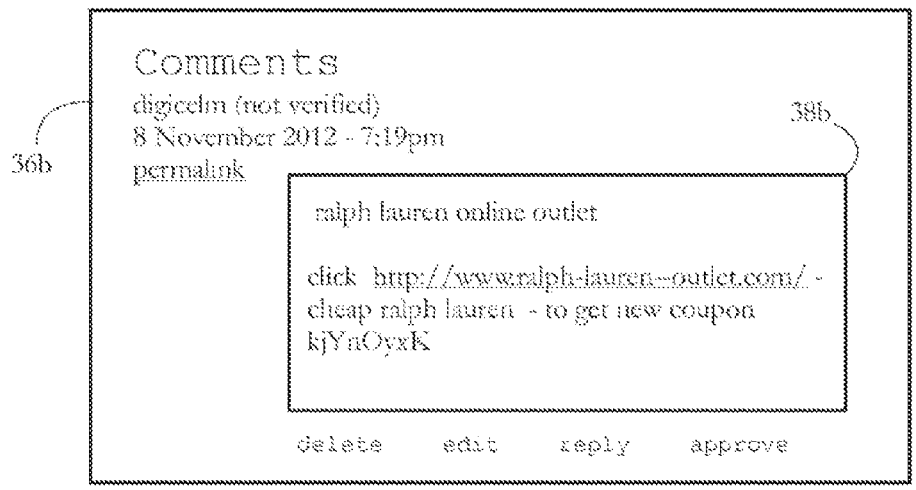
FIG. 3-B

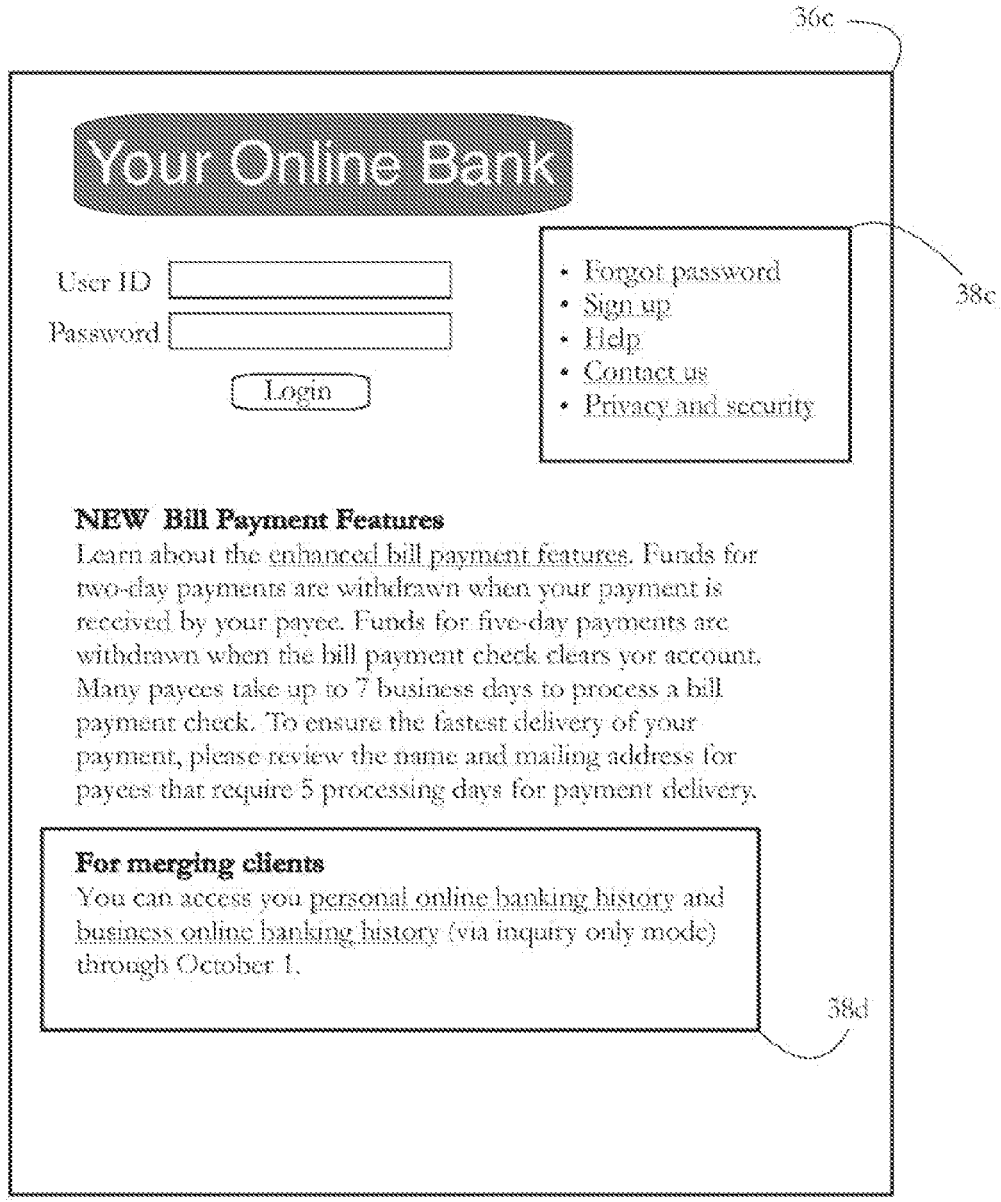
FIG. 3-C

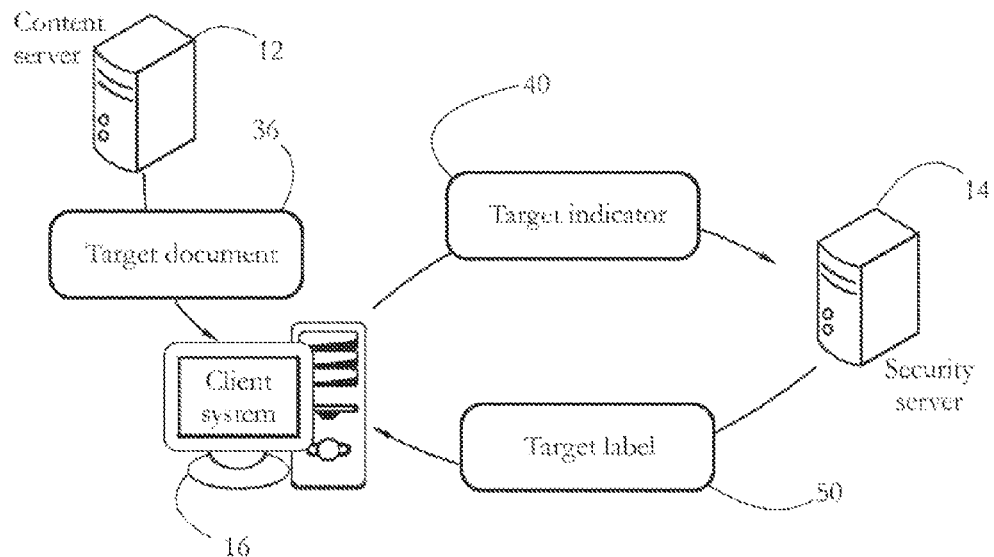
FIG. 4-A
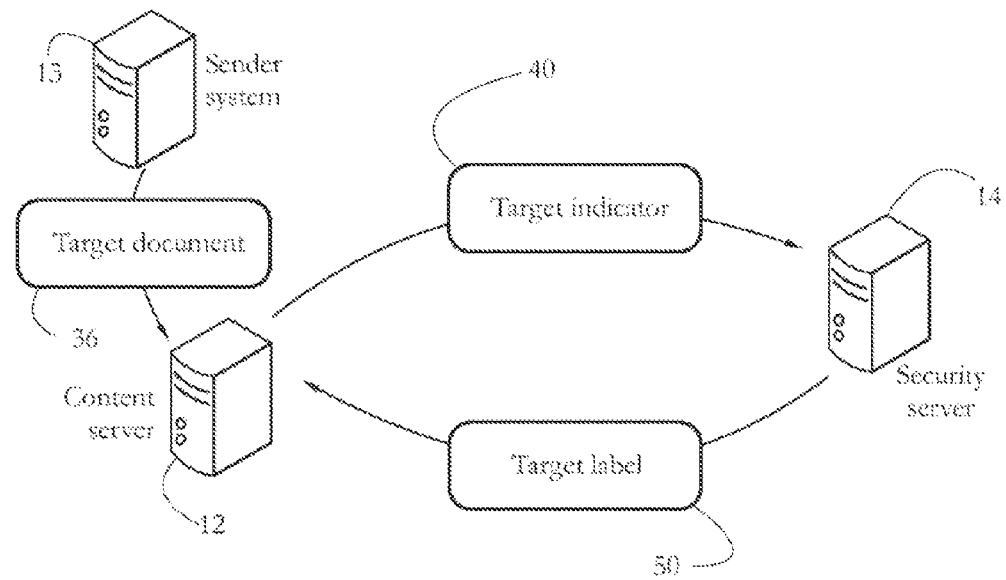
FIG. 4-B

DOCUMENT CLASSIFICATION USING MULTISCALE TEXT FINGERPRINTS

RELATED APPLICATION DATA

This application is a continuation of U.S. patent application Ser. No. 13/790,636, filed Mar. 8, 2013, which is herein incorporated by reference.

BACKGROUND

The invention relates to methods and systems for classifying electronic documents, and in particular to systems and methods for filtering unsolicited electronic communications (spam) and detecting fraudulent online documents.

Unsolicited electronic communications, also known as spam, form a significant portion of communication traffic worldwide, affecting both computer and telephone messaging services. Spam may take many forms, from unsolicited email communications, to spam messages masquerading as user comments on various Internet sites such as blogs and social network sites. Spam takes up valuable hardware resources, affects productivity, and is considered annoying and intrusive by many users of communication services and/or the Internet.

Online fraud, especially in the form of phishing and identity theft, has been posing an increasing threat to Internet users worldwide. Sensitive identity information such as user names, IDs, passwords, social security and medical records, bank and credit card details obtained fraudulently by international criminal networks operating on the Internet, are used to withdraw private funds and/or are further sold to third parties. Beside direct financial damage to individuals, online fraud also causes a range on unwanted side effects, such as increased security costs for companies, higher retail prices and banking fees, declining stock values, lower wages and decreased tax revenue.

In an exemplary phishing attempt, a fake website (also termed a clone) may pose as a genuine webpage belonging to an online retailer or a financial institution, asking the user to enter some personal information, such as a username or password, or some financial information, e.g. credit card number, account number, or security code. Once the information is submitted by the unsuspecting user, it may be harvested by the fake website. Additionally, the user may be directed to another webpage, which may install malicious software on the user's computer. The malicious software (e.g., viruses, Trojans) may continue to steal personal information by recording the keys pressed by the user while visiting certain webpages, and may transform the user's computer into a platform for launching other phishing or spam attacks.

In the case of email spam or email fraud, software running on a user's or email service provider's computer system may be used to classify email messages as spam/non-spam (or as fraudulent/legitimate) and even to discriminate between various kinds of messages, for instance, between product offers, adult content, and Nigerian fraud. Spam/fraudulent messages can then be directed to special folders or deleted. Similarly, software running on a content provider's computer systems may be used to intercept spam/fraudulent messages posted to a website hosted by the respective content provider, and to prevent the respective messages from being displayed, or to display a warning to the users of the website that the respective messages may be fraudulent or spam.

Several approaches have been proposed for identifying spam and/or online fraud, including matching a message's originating address to lists of known offending or trusted addresses (techniques termed black- and white-listing, respectively), searching for certain words or word patterns (e.g. refinancing, Viagra®, stock), and analyzing message headers. Feature extraction/matching methods are sometimes used in conjunction with automated data classification methods (e.g., Bayesian filtering, neural networks).

Some proposed methods employ hashing to produce compact representations of electronic text messages. Such representations allow for efficient inter-message comparison, for spam or fraud detection purposes.

Spammers and online fraudsters attempt to circumvent detection by using various obfuscation methods, such as misspelling certain words, embedding spam and/or fraudulent content into larger blocks of text masquerading as legitimate documents, and altering the form and/or content of messages from one distribution wave to another. Anti-spam and anti-fraud methods employing hashing are typically vulnerable to such obfuscation, since small changes in text may produce substantially different hashes. Successful detection may therefore benefit from methods and systems capable of recognizing polymorphic spam and fraud.

SUMMARY

According to one aspect, a client computer system comprises at least one processor configured to determine a text fingerprint of a target electronic document so that a length of the text fingerprint is constrained between a lower bound and an upper bound, wherein the lower and upper bounds are predetermined. Determining the text fingerprint comprises: selecting a plurality of text tokens of the target electronic document, and in response to selecting the plurality of text tokens, determining a fingerprint fragment size according to the upper and lower bounds, and according to a count of the selected plurality of text tokens. Determining the text fingerprint further comprises: determining a plurality of fingerprint fragments, each fingerprint fragment of the plurality of fingerprint fragments determined according to a hash of a distinct text token of the selected plurality of text tokens, each fingerprint fragment consisting of a sequence of characters, a length of the sequence chosen to equal the fingerprint fragment size; and concatenating the plurality of fingerprint fragments to form the text fingerprint.

According to another aspect, a server computer system comprises at least one processor configured to perform transactions with a plurality of client systems, wherein a transaction comprises: receiving a text fingerprint from a client system of the plurality of client systems, the text fingerprint determined for a target electronic document so that a length of the text fingerprint is constrained between a lower bound and an upper bound, wherein the lower and upper bounds are predetermined; and sending to the client system a target label indicative of a category of documents that the target electronic document belongs to. Determining the text fingerprint comprises: selecting a plurality of text tokens of the target electronic document, and in response to selecting the plurality of text tokens, determining a fingerprint fragment size according to the upper and lower bounds, and according to a count of the selected plurality of text tokens. Determining the text fingerprint further comprises: determining a plurality of fingerprint fragments, each fingerprint fragment of the plurality of fingerprint fragments determined according to a hash of a distinct text token of the selected plurality of text tokens, each fingerprint fragment consisting of a sequence of characters, a length of the sequence chosen to equal the fingerprint fragment size; and concatenating the plurality of fingerprint fragments to form the text fingerprint. Determining the target label comprises: retrieving a reference fingerprint from a database of reference fingerprints, the reference fingerprint determined for a reference electronic document belonging to the category, the reference fingerprint selected according to a length of the reference fingerprint so that the length of the reference fingerprint is between the upper and lower bounds; and determining whether the target electronic document belongs to the category according to a result of comparing the text fingerprint to the reference fingerprint.

According to another aspect, a method comprises employing at least one processor of a client computer system to determine a text fingerprint of a target electronic document so that a length of the text fingerprint is constrained between a lower bound and an upper bound, wherein the lower and upper bounds are predetermined. Determining the text fingerprint comprises: selecting a plurality of text tokens of the target electronic document, and in response to selecting the plurality of text tokens, determining a fingerprint fragment size according to the upper and lower bounds, and according to a count of the selected plurality of text tokens. Determining the text fingerprint further comprises: determining a plurality of fingerprint fragments, each fingerprint fragment of the plurality of fingerprint fragments determined according to a hash of a distinct text token of the selected plurality of text tokens, each fingerprint fragment consisting of a sequence of characters, a length of the sequence chosen to equal the fingerprint fragment size; and concatenating the plurality of fingerprint fragments to form the text fingerprint.

According to another aspect, a method comprises employing at least one processor of a server computer system configured to perform transactions with a plurality of client systems, to: receive a text fingerprint from a client system of the plurality of client systems, the text fingerprint determined for a target electronic document so that a length of the text fingerprint is constrained between a lower bound and an upper bound, wherein the lower and upper bounds are predetermined; and to send to the client system a target label determined for the target electronic document, the target label indicating a category of documents that the target electronic document belongs to. Determining the text fingerprint comprises: selecting a plurality of text tokens of the target electronic document, and in response to selecting the plurality of text tokens, determining a fingerprint fragment size according to the upper and lower bounds, and according to a count of the selected plurality of text tokens. Determining the text fingerprint further comprises: determining a plurality of fingerprint fragments, each fingerprint fragment of the plurality of fingerprint fragments determined according to a hash of a distinct text token of the selected plurality of text tokens, each fingerprint fragment consisting of a sequence of characters, a length of the sequence chosen to equal the fingerprint fragment size; and concatenating the plurality of fingerprint fragments to form the text fingerprint. Determining the target label comprises: retrieving a reference fingerprint from a database of reference fingerprints, the reference fingerprint determined for a reference electronic document belonging to the category, the reference fingerprint selected according to a length of the reference fingerprint so that the length of the reference fingerprint is between the upper and lower bounds; and determining whether the target electronic document belongs to the category according to a result of comparing the text fingerprint to the reference fingerprint.

BRIEF DESCRIPTION OF THE DRAWINGS

The foregoing aspects and advantages of the present invention will become better understood upon reading the following detailed description and upon reference to the drawings where:

FIG. 1 shows an exemplary anti-spam/anti-fraud system comprising a security server protecting a plurality of client systems, according to some embodiments of the present invention.

FIG. 2-A shows an exemplary hardware configuration of a client computer system according to some embodiments of the present invention.

FIG. 2-B shows an exemplary hardware configuration of a security server computer system according to some embodiments of the present invention.

FIG. 2-C shows an exemplary hardware configuration of a content server computer system according to some embodiments of the present invention.

FIG. 3-A shows an exemplary spam email message comprising a text block, according to some embodiments of the present invention.

FIG. 3-B shows an exemplary spam blog comment comprising a text block, according to some embodiments of the present invention.

FIG. 3-C illustrates an exemplary fraudulent webpage comprising a plurality of text blocks, according to some embodiments of the present invention.

FIG. 4-A illustrates an exemplary spam/fraud detection transaction between a client computer and the security server, according to some embodiments of the present invention.

FIG. 4-B illustrates an exemplary spam/fraud detection transaction between a content server and the security server, according to some embodiments of the present invention.

DETAILED DESCRIPTION OF PREFERRED EMBODIMENTS

Figure 5:
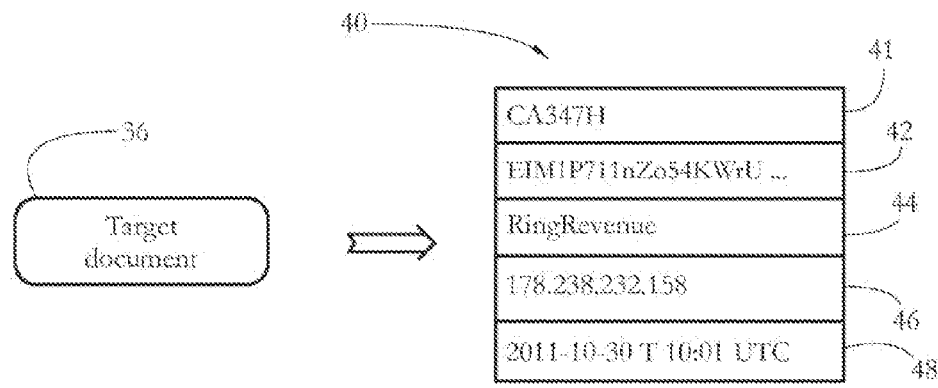
FIG. 5 shows an exemplary target indicator of a target electronic document, the indicator comprising a text fingerprint and other spam/fraud-identifying data, according to some embodiments of the present invention.

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Unless otherwise specified, a hash is an output of a hash function. Unless otherwise specified, a hash function is a mathematical transformation mapping a sequence of symbols (e.g. characters, bits) into a number or bit string. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

FIG. 1 shows an exemplary anti-spam/anti-fraud system 10 according to some embodiments of the present invention. System 10 includes a content server 12, a sender system 13, a security server 14, and a plurality of client systems 16a-c, all connected by a communication network 18. Network 18 may be a wide-area network such as the Internet, while parts of network 18 may also include a local area network (LAN).

In some embodiments, content server 12 is configured to receive user-contributed content (e.g., articles, blog entries, media uploads, comments etc.) from a plurality of users, and to organize, format, and distribute such content to third parties such as client systems 16a-c. An exemplary embodiment of content server 12 is an email server providing electronic message delivery to client systems 16a-c. Another embodiment of content server 12 is a computer system hosting a blog or a social networking site. In some embodiments, user-contributed content circulates over network 18 in the form of electronic documents, also referred to as target documents in the following description. Electronic documents include webpages (e.g, HTML documents) and electronic messages such as email and short message service (SMS) messages, among others. A portion of user-contributed data received at server 12 may comprise unsolicited and/or fraudulent messages and documents.

In some embodiments, sender system 13 comprises a computer system sending unsolicited communications, such as spam email messages, to client systems 16a-c. Such messages may be received at server 12, and then sent to client systems 16a-c. Alternatively, messages received at server 12 may be made available (e.g. through a web interface) for retrieval by client systems 16a-c. In other embodiments, sender system 13 may send unsolicited communications such as spam blog comments, or spam posted to a social networking site, to content server 12. Client systems 16a-c may then retrieve such communications via a protocol such as hypertext transfer protocol (HTTP).

Security server 14 may include one or more computer systems, performing a classification of electronic documents as shown in detail below. Performing such classification may include identifying unsolicited messages (spam) and/or fraudulent electronic documents such as phishing messages and webpages. In some embodiments, performing the classification includes a collaborative spam/fraud-detection transaction carried out between security server 14 and content server 12, and/or between security server 14 and client systems 16a-b.

Client systems 16a-c may include end-user computers, each having a processor, memory, and storage, and running an operating system such as Windows®, MacOS® or Linux. Some client computer systems 16a-c may be mobile computing and/or telecommunication devices such as tablet PCs, mobile telephones, personal digital assistants (PDA), and household devices such as TVs or music players, among others. In some embodiments, client systems 16a-c may represent individual customers, or several client systems may belong to the same customer. Client systems 16a-c may access electronic documents, for instance email messages, either by receiving such documents from sender system 13 and storing them in a local inbox, or by retrieving such documents over network 18, for instance from a website served by content server 12.

FIG. 2-A shows an exemplary hardware configuration of a client system 16, such as systems 16a-c of FIG. 1. FIG. 2-A shows a computer system for illustrative purposes; the hardware configuration of other devices, such as mobile telephones, may differ. In some embodiments, client system 16 comprises a processor 20, a memory unit 22, a set of input devices 24, a set of output devices 26, a set of storage devices 28, and a communication interface controller 30, all connected by a set of buses 34.

In some embodiments, processor 20 comprises a physical device (e.g. multi-core integrated circuit) configured to execute computational and/or logical operations with a set of signals and/or data. In some embodiments, such logical operations are delivered to processor 20 in the form of a sequence of processor instructions (e.g. machine code or other type of software). Memory unit 22 may comprise volatile computer-readable media (e.g. RAM) storing data/signals accessed or generated by processor 20 in the course of carrying out instructions. Input devices 24 may include computer keyboards, mice, and microphones, among others, including the respective hardware interfaces and/or adapters allowing a user to introduce data and/or instructions into system 16. Output devices 26 may include display devices such as monitors and speakers among others, as well as hardware interfaces/adapters such as graphic cards, allowing system 16 to communicate data to a user. In some embodiments, input devices 24 and output devices 26 may share a common piece of hardware, as in the case of touch-screen devices. Storage devices 28 include computer-readable media enabling the non-volatile storage, reading, and writing of software instructions and/or data. Exemplary storage devices 28 include magnetic and optical disks and flash memory devices, as well as removable media such as CD and/or DVD disks and drives. Communication interface controller 30 enables system 16 to connect to network 18 and/or to other devices/computer systems. Buses 34 collectively represent the plurality of system, peripheral, and chipset buses, and/or all other circuitry enabling the inter-communication of devices 20-30 of client system 16. For example, buses 34 may comprise the northbridge connecting processor 20 to memory 22, and/or the southbridge connecting processor 20 to devices 24-30, among others.

FIG. 2-B shows an exemplary hardware configuration of security server 14 according to some embodiments of the present invention. Security server 14 includes a processor 120 and a memory unit 122, and may further comprise a set of storage devices 128 and at least one communication interface controller 130, all interconnected via a set of buses 134. In some embodiments, the operation of processor 120, memory 122, and storage devices 128 may be similar to the operation of items 20, 22, and 28, respectively, as described above in relation to FIG. 2-A. Memory unit 122 stores data/signals accessed or generated by processor 120 in the course of carrying out instructions. Controller(s) 130 enable(s) security server 14 to connect to network 18, to transmit and/or receive data to/from other systems connected to network 18.

FIG. 2-C shows an exemplary hardware configuration of content server 12 according to some embodiments of the present invention. Content server 12 includes a processor 220 and a memory unit 222, and may further comprise a set of storage devices 228 and at least one communication interface controller 230, all interconnected by a set of buses 234. In some embodiments, the operation of processor 220, memory 222, and storage devices 228 may be similar to the operation of items 20, 22, and 28, respectively, as described above. Memory unit 222 stores data/signals accessed or generated by processor 220 in the course of carrying out instructions. In some embodiments, interface controller(s) 230 enable(s) content server 12 to connect to network 18, and to transmit and/or receive data to and/or from other systems connected to network 18.

FIG. 3-A shows an exemplary target document 36a comprising spam email, according to some embodiments of the present invention. Target document 36a may comprise a header and a payload, the header including message routing data, e.g., an indicator of the sender and/or an indicator of the recipient, and/or other data such as a timestamp and an indicator of content type, e.g. Multipurpose Internet Mail Extensions (MIME) type. The payload may include data displayed as text and/or images to a user. Software executing on content server 12 and/or client systems 16a-c may process the payload to produce a target text block 38a of target document 36a. In some embodiments, target text block 38a comprises a sequence of signs and/or symbols intended to be interpreted as text. Text block 38a may include special characters like punctuation symbols, as well as character sequences representing network addresses, Uniform Resource Locators (URL), email addresses, pseudonyms, and aliases, among others. Target text block 38a may be directly embedded into target document 36a, e.g., as a plain-text MIME part, or may comprise a result of processing a set of computer instructions embedded in document 36a. For example, target text block 38a may include a result of rendering a set of Hypertext Markup Language (HTML) instructions, or a result of executing a set of client-side or server-side script instructions (e.g., PHP, Javascript) embedded in target document 36a. In another embodiment, target text block 38a may be embedded into an image, as in the case of image spam.

FIG. 3-B shows another exemplary target document 36b, comprising a comment posted on a webpage such as a blog, an online news page, or a social networking page. In some embodiments, document 36b comprises contents of a set of data fields, e.g. fields of a form embedded in an HTML document. Filling such form fields may be performed remotely by a human operator and/or automatically by a piece of software executing on sender system 13, for instance. In some embodiments, the display of document 36b comprises a text block 38b, consisting of a sequence of characters and/or symbols intended to be interpreted as text by a user accessing the respective website. Text block 38b may include hyperlinks, special characters, emoticons, and images, among others.

FIG. 3-C illustrates another exemplary target document 36c, comprising a phishing webpage. Document 36c may be delivered as a set of HTML and/or server-side or client-side script instructions, which, when executed, determine a document viewer (e.g., a web browser) to produce a set of images and/or a set of text blocks. Two such exemplary text blocks 38c-d are illustrated in FIG. 3-C. Text blocks 36c-d may include hyperlinks and email addresses.

FIG. 4-A shows an exemplary spam/fraud-detection transaction between an exemplary client system 16, such as client systems 16a-c of FIG. 1, and security server 14, according to some embodiments of the present invention. The exchange illustrated in FIG. 4-A occurs, for instance, in an embodiment of system 10 configured to detect email spam. After receiving a target document 36, e.g. an email message, from content server 12, client system 16 may determine a target indicator 40 of target document 36, and may send target indicator 40 to security server 14. Target indicator 40 comprises data allowing security server 14 to perform a classification of target document 36, to determine, for instance, whether document 36 is spam or not. In response to receiving target indicator 40, security server 14 may send a target label 50 indicating whether document 36 is spam or not, to the respective client system 16.

Another embodiment of spam-detecting transaction is illustrated in FIG. 4-B, and occurs between content server 12 and security server 14. Such exchanges may occur, for instance, to detect unsolicited communications posted to blogs and/or social network websites, or to detect phishing webpages. Content server 12 hosting and/or displaying the respective website may receive target document 36 (e.g., a blog comment). Content server 12 may process the respective communication to produce target indicator 40 of the respective document, and may send target indicator to security server 14. In return, server 14 may determine target label 50 indicating whether the respective document is spam or fraudulent, and send label 50 to content server 12.

FIG. 5 shows an exemplary target indicator 40 determined for an exemplary target document 36, such as e-mail message 36a in FIG. 3-A. In some embodiments, target indicator 40 is a data structure including a message identifier 41 (e.g., hash index) uniquely associated to target document 36, and a text fingerprint 42 determined for a text block of document 36, such as text block 38a in FIG. 3-A. Target indicator 40 may further include a sender indicator 44 indicative of a sender of document 36, a routing indicator 46 indicative of a network address (e.g., IP address) where document 36 originated, and a time stamp 48 indicative of a moment in time when document 36 was sent and/or received. In some embodiments, target indicator 40 may comprise other spam-indicative and/or fraud-indicative features of document 36, such as a flag indicating whether document 36 includes images, a flag indicating whether document 36 includes hyperlinks, and a document layout indicator determined for document 36, among others.

Figure 6:
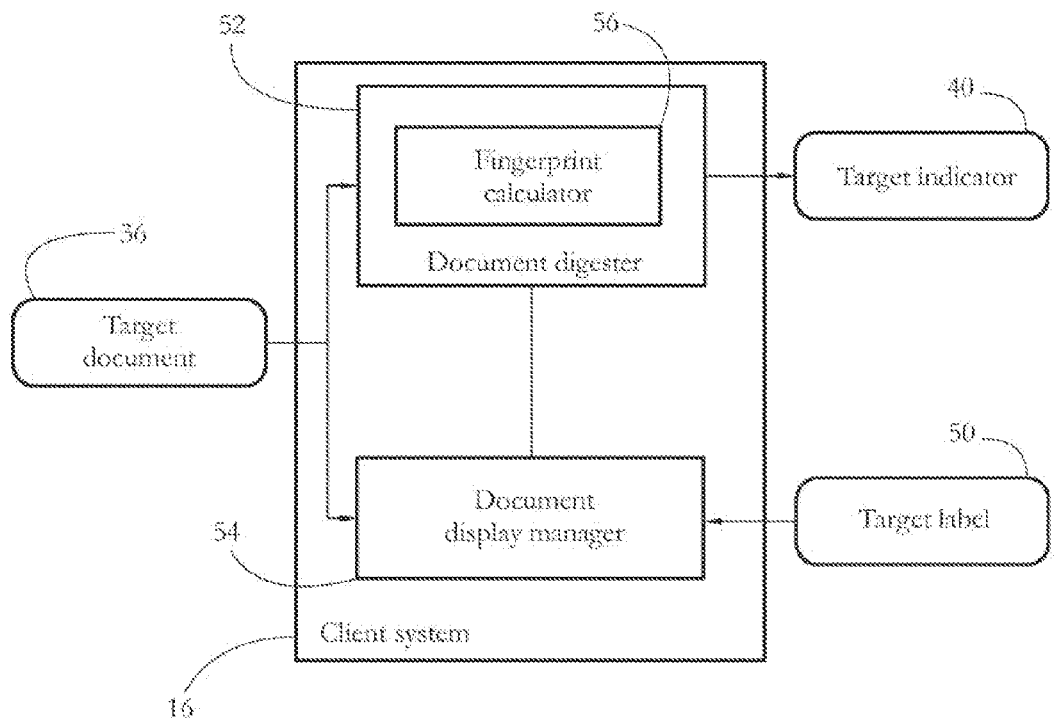
FIG. 6 shows a diagram of an exemplary set of applications executing on a client system according to some embodiments of the present invention.

FIG. 6 shows an exemplary set of components executing on client system 16 according to some embodiments of the present invention. The configuration illustrated in FIG. 6 is suited, for instance, for detecting spam email messages received at client system 16. System 16 comprises a document digester 52 and a document display manager 54 connected to document digester 52. Document digester 52 may further comprise a fingerprint calculator 56. In some embodiments, document digester 52 receives target document 36

(e.g., an email message), and processes document 36 to produce target indicator 40. Processing document 36 may include parsing document 36 to identify distinct data fields and/or types, and to distinguish header data from payload data, among others. When document 36 is an email message, an exemplary parsing may produce distinct data objects for sender, IP address, subject, timestamp, and contents of the respective message, among others. When the contents of document 36 include data of a plurality of MIME types, parsing may yield a distinct data object for each MIME type, such as plain text, HTML, and images, among others. Document digester 52 may then formulate target indicator 40, for instance by filling in the respective fields of target indicator 40, such as sender, routing address, and timestamp, among others. A software component of client system 16 may then transmit target indicator 40 to security server 14 for analysis.

In some embodiments, document display manager 54 receives target document 36, translates it into a visual form and displays it on an output device of client system 16. Some embodiments of display manager 54 may also allow a user of client system 16 to interact with the displayed content. Display manager 54 may be integrated with off-the shelf document display software such as web browsers, email readers, e-book readers, and media players, among others. Such integration may be achieved in the form of software plugins, for instance. Display manager 54 may be configured to assign target document 36 (e.g., incoming email) to a document class, such as spam, legitimate, and/or various other classes and subclasses of documents. Such classification may be determined according to target label 50 received from security server 14. Display manager 54 may be further configured to group spam/fraud messages into separate folders and/or only display legitimate messages to the user. Manager 54 may also label document 36 according to such classification. For instance, document display manager 54 may display spam/fraud messages in a distinctive color, or display a flag indicating a classification of the respective message (e.g., spam, phishing, etc.) next to each spam/fraud message. Similarly, when document 36 is a fraudulent webpage, display manager 54 may block the access of the user to the respective page and/or display a warning to the user.

In an embodiment configured to detect spam/fraud posted as comments on blogs and social network sites, document digester 52 and display manager 54 may execute on content server 12, instead of client systems 16a-c as shown in FIG. 6. Such software may be implemented on content server 12 in the form of server-side scripts, which may be further incorporated, for instance as plugins, into larger script packages, e.g. as anti-spam/anti-fraud plugins for the Wordpress® or Drupal® online publishing platforms. Upon determining that target document 36 is spam or fraudulent, display manager 54 may be configured to block the respective message, preventing it from being displayed within the respective website.

Fingerprint calculator 56 (FIG. 6) is configured to determine a text fingerprint of target document 36, which constitutes a part of target indicator 40 (e.g., item 42 in FIG. 5). In some embodiments, a fingerprint determined for a target electronic document comprises a sequence of characters, the length of the sequence being constrained between a predetermined upper bound and a predetermined lower bound (for instance, between 129 and 256 characters, inclusively). Having such fingerprints within a predetermined range of length may be desirable, allowing efficient comparison against a collection of reference fingerprints, to identify text blocks comprising spam and/or fraud, as shown in more detail below. In some embodiments, characters forming the fingerprint may comprise alphanumeric characters, special characters and symbols (e.g., *, /, $, etc.), among others. Other exemplary characters used to form text fingerprints include digits or other symbols used in representing numbers in various encodings such as binary, hexadecimal, and Base64, among others.

Figure 7:
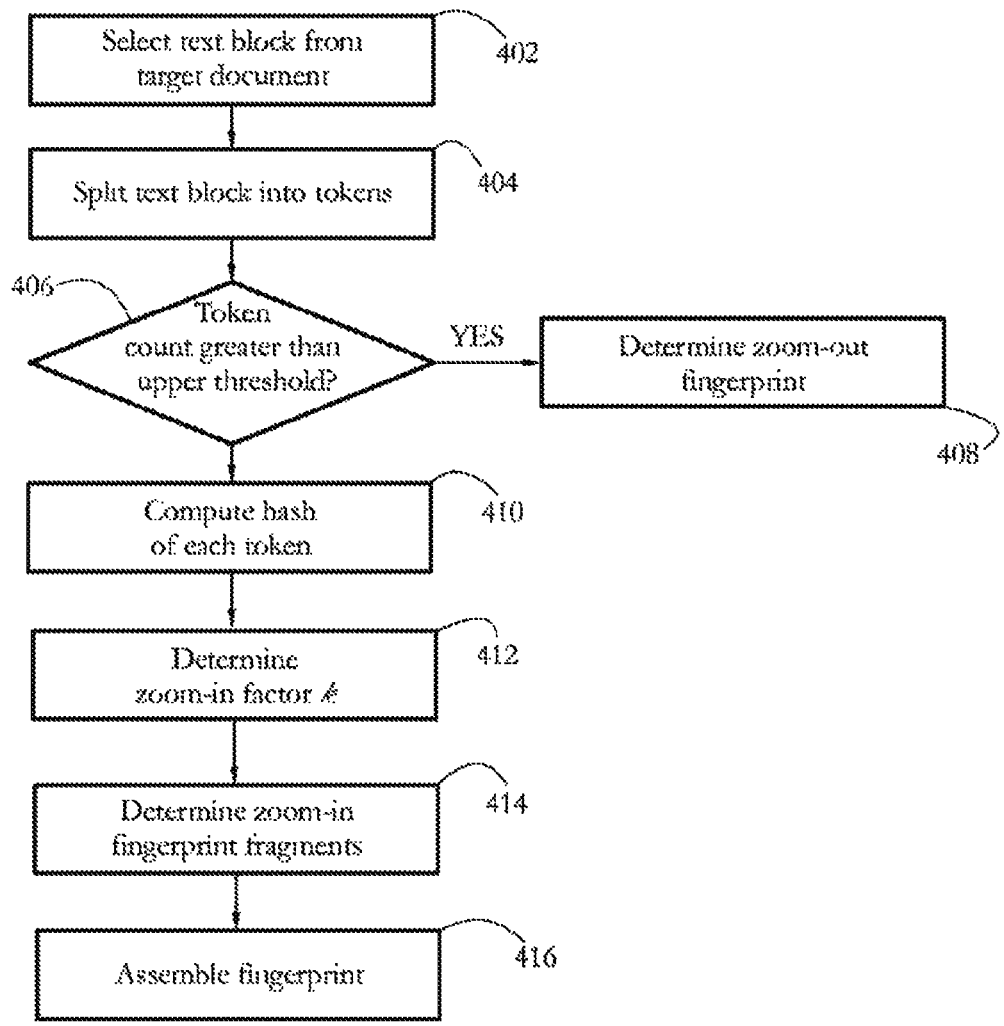
FIG. 7 illustrates an exemplary sequence of steps performed by the fingerprint calculator of FIG. 6, according to some embodiments of the present invention.

FIG. 7 illustrates an exemplary sequence of steps performed by fingerprint calculator 56 to determine a text fingerprint. In a step 402, fingerprint calculator may select a target text block of target document 36 for fingerprint calculation. In some embodiments, the target text block may consist of substantially all text content of target document 36, e.g. a plain-text MIME part of document 36. In some embodiments, the target text block may consist of a single paragraph of a text part of document 36. In an embodiment configured to filter web-based spam, the target text block may consist of the contents of a blog comment, or of another kind of message (e.g. Facebook® wall post, Twitter® tweet, etc.) sent in by a user and intended to be posted on the respective website. In some embodiments, the target text block comprises the contents of a section of an HTML document, for instance a section indicated by DIV or SPAN tags.

Figure 8:
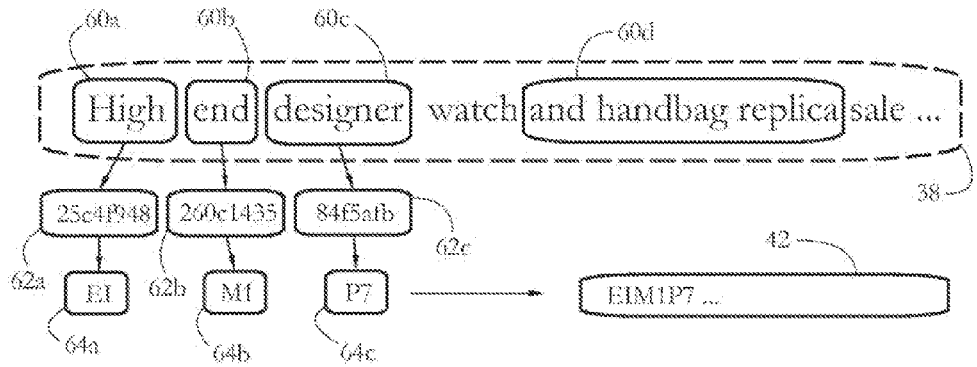
FIG. 8 shows an exemplary determination of a text fingerprint of a target text block, according to some embodiments of the present invention.

In a step 404, fingerprint calculator 56 may split the target text block into text tokens. FIG. 8 shows an exemplary segmentation of a text block 38 into a plurality of text tokens 60a-c. In some embodiments, text tokens are sequences of characters/symbols separated from other text tokens by any of a set of delimiter characters/symbols. Exemplary delimiters for Western language scripts include space, line break, tab, '\r', '\0', period, comma, colon, semicolon, parentheses and/or brackets, backward and/or forward slashes, double slashes, mathematical symbols such as '+', '−', '*', '^', punctuation marks such as '!' and '?', and special characters such as '$', and '|', among others. Exemplary tokens in FIG. 8 are individual words; other examples of text tokens may include multiple-word sequences, email addresses, and URLs, among others. To identify individual tokens of text block 38, fingerprint calculator may use any string tokenization algorithm known in the art. Some embodiments of fingerprint calculator 56 may consider certain tokens, for instance common words such as 'a' and 'the' in English, as ineligible for fingerprint calculation. In some embodiments, tokens exceeding a predetermined maximum length are further partitioned into shorter tokens.

In some embodiments, the length of the text fingerprints determined by calculator 56 is constrained within a predetermined range (e.g. between 129 and 256 characters, inclusively), irrespective of the length or token count of the respective target text block. To compute such a fingerprint, in a step 406, fingerprint calculator 56 may first determine a count of text tokens of the target text block, and compare said count to a pre-determined upper threshold, determined according to an upper bound of fingerprint length. When the token count exceeds the upper threshold (e.g., 256), in a step 408, calculator 56 may determine a zoomed-out fingerprint, as shown in detail below.

When the token count falls below the upper threshold, in a step 410, fingerprint calculator may compute a hash of each text token. FIG. 8 shows exemplary hashes 62a-c, determined for text tokens 60a-c, respectively. Hashes 62a-c are shown in hexadecimal notation. In some embodiments, such hashes are the result of applying a hash function to each token 60a-c. Many such hash functions and algorithms are known in the art. Naïve hash algorithms are fast, but typically produce a large number of collisions (situations wherein distinct tokens have identical hashes). More sophisticated hashes, such as those computed by a message digest algorithm like MD5, are allegedly collision-free, but carry a significant computational expense. Some embodiments of the present invention compute hashes 62a-c using hash algorithms offering a trade-off between computational speed and collision avoidance. An example of such algorithm is attributed to Robert Sedgewick, and is known in the art as RSHash. A pseudocode of RSHash is shown below:

```
foreach ( byte x ; bytes ) {
    value = value * a + x;
    a *= b;
}
return value;
``` wherein a and b denote integer numbers, for instance, a=63, 689, and b=378,551.

The size (number of bits) of hashes 62a-c may influence the likelihood of collisions, and therefore the spam detection rate. In general, using a small hash increases the likelihood of collisions. Larger hashes are in general less vulnerable to collisions, but are more expensive in terms of computation speed and memory. Some embodiments of fingerprint calculator 56 compute items 62a-c as 30-bit hashes.

Fingerprint calculator 56 may now determine the actual text fingerprint of the target text block. FIG. 8 further illustrates an exemplary fingerprint 42 determined for target text block 38. Text fingerprint 42 comprises a sequence of characters determined according to hashes 62a-c determined in step 410. In some embodiments, for each token 60a-c, fingerprint calculator 56 determines a fingerprint fragment, illustrated as items 64a-c in FIG. 8. In some embodiments, such fragments are then concatenated to produce fingerprint 42.

Figure 9:
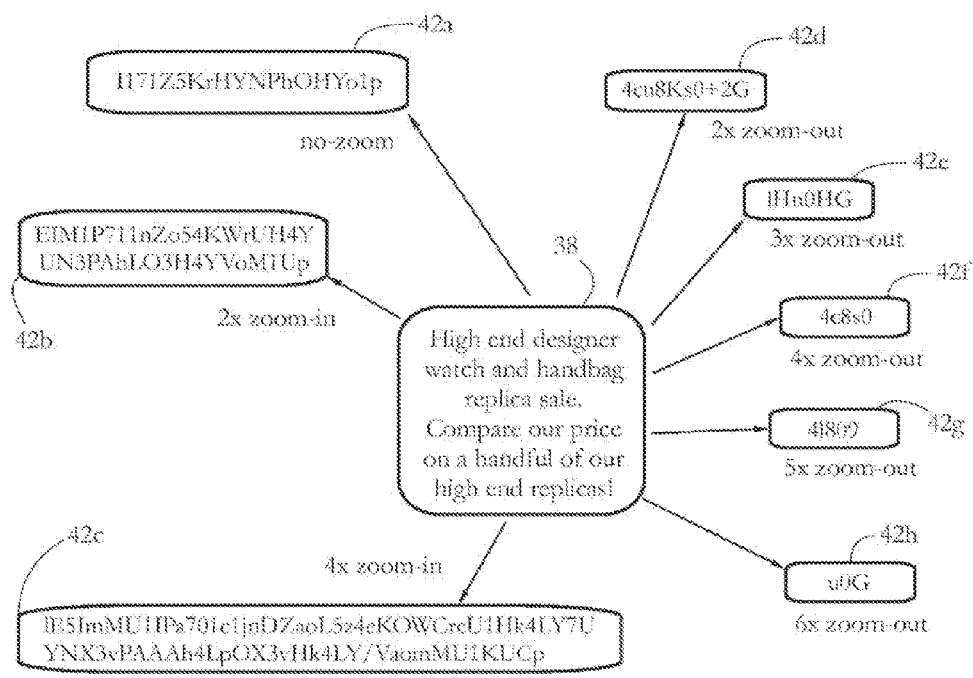
FIG. 9 shows a plurality of fingerprints determined for a target text block at various zoom-in and zoom-out factors, according to some embodiments of the present invention.

Each fingerprint fragment 64a-c may comprise a character sequence determined according to hash 62a-c of the respective token 60a-c. In some embodiments, all fingerprint fragments 64a-c have the same length: in the example of FIG. 8, each fragment 64a-c consists of two characters. Said length of fingerprint fragments is determined so that the respective fingerprint has a length within the desired range, e.g. 129 to 256 characters. In some embodiments, the length of fingerprint fragments is referred to as the zoom-in factor k. For instance, fragments of length 1 are no-zoom fragments (zoom-in factor 1), producing no-zoom fingerprints; fragments of length 2 are 2× zoom-in fragments (zoom-in factor 2), producing 2× zoom-in fingerprints, and so on. FIG. 9 shows a plurality of text fingerprints 42a-c determined for text block 38 at various zoom-in factors k.

In a step 412 (FIG. 7), fingerprint calculator 56 determines a value of the zoom-in factor k that produces a fingerprint length within the desired, predetermined range. For instance, when the token count is larger than a lower threshold, determined according to the lower bound of desired fingerprint lengths, fingerprint calculator may decide to compute a no-zoom fingerprint (k=1), since the no-zoom fingerprint is already within the desired range of lengths. When text block 38 has too few tokens, fingerprint calculator may compute a 2×, or a 3× zoom-in fingerprint, for instance.

Next, in a step 414, fingerprint calculator 56 computes a fingerprint fragment for each token, according to the respective hash of said token. To determine fragments 64a-c, fingerprint calculator 56 may use any encoding scheme known in the art, such as a binary or a Base64 representation of hashes 62a-c. Such encoding schemes establish a one-to-one map between a number and a sequence of characters from a predetermined alphabet. For instance, when using a Base64 representation, every group of six consecutive bits of a hash may be mapped into a character.

In some embodiments, a plurality of fingerprint fragments may be determined for each hash, by varying the number of characters used to represent the respective hash. To produce a fragment of length 1 (e.g. zoom-in factor 1), some embodiments use only the six least significant bits of the respective hash. A fragment of length 2 (e.g. zoom-in factor 2) may be produced using an additional six bits of the respective hash, and so on. In Base64 representation, a 30-bit hash may therefore yield fingerprint fragments up to 5 characters long, corresponding to five zoom-in factors. Table 1 shows exemplary fingerprint fragments computed at various zoom-in factors, from the exemplary text block 38 in FIG. 9.

TABLE 1

| token | hash | fragment at zoom-in factor 1 | fragment at zoom-in factor 2 | fragment at zoom-in factor 4 |
|---|---|---|---|---|
| high | 25c4f948 | I | EI | 1E5I |
| end | 260c1435 | 1 | M1 | mMU1 |
| designer | 84f5afb | 7 | P7 | IPa7 |
| watch | 34f5dc75 | 1 | 11 | 01c1 |
| and | 2367c3d9 | Z | nZ | jnDZ |
| handbag | 1aa88b79 | 4 | o5 | aoL5 |
| replica | 33381eca | K | 4K | z4eK |
| sale | e96c2eb | r | Wr | OWCr |
| compare | 1c947587 | H | UH | cU1H |
| our | 24b80bd8 | Y | 4Y | k4LY |
| price | 3b54d80d | N | UN | 7UYN |
| on | 1777af4f | P | 3P | X3vP |
| a | 61 | h | Ah | AAAh |
| handful | 380be94e | O | LO | 4LpO |
| of | 1777af47 | H | 3H | X3vH |
| our | 24b80bd8 | Y | 4Y | k4LY |
| high | 3f155a68 | o | Vo | /Vao |
| end | 260c1435 | 1 | M1 | mMU1 |
| replicas | ad4c229 | p | Up | KUCp |

In a step 416 (FIG. 7), fingerprint calculator 56 assembles text fingerprint 42, for instance by concatenating the fragments computed in step 414.

Figure 10:
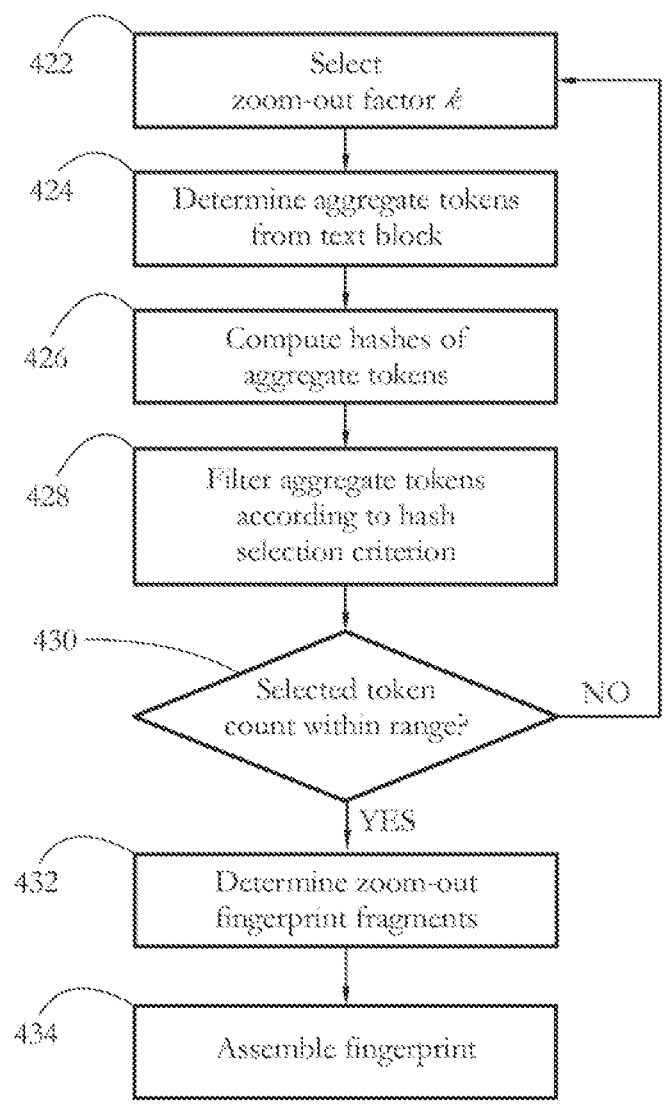
FIG. 10 illustrates an exemplary sequence of steps performed by the fingerprint calculator to determine a zoom-out fingerprint according to some embodiments of the present invention.

Going back to step 406, when the token count was found to be greater than the upper threshold, fingerprint calculator 56 determines a zoom-out fingerprint of the respective text block. In some embodiments, zooming out comprises computing fingerprint 42 from only a subset of tokens of text block 38. Selecting the subset may comprise pruning the plurality of text tokens determined in step 404 according to a hash selection criterion. An exemplary sequence of steps performing such a calculation is illustrated in FIG. 10. A step 422 selects a zoom-out factor for fingerprint calculation. In some embodiments, a zoom-out factor denoted as k indicates that, on average, only 1/k of the tokens of text block 38 are used for fingerprint calculation. Fingerprint calculator 56 may therefore select the zoom-out factor according to the token count determined in step 406 (FIG. 7). In some embodiments, the initial selection of zoom-out factor may not produce a fingerprint within the desired range of lengths (see below); in such cases, steps 422-430 may be executed in a loop, in trial-and-error fashion, until a fingerprint of appropriate length is generated. For instance, fingerprint calculator 56 may initially select a zoom-out factor k=2; when this value fails to produce a short enough fingerprint, calculator 56 may select k=3, etc.

Next, fingerprint calculator may select tokens according to a hash selection criterion. When zooming out, fingerprint calculator 56 may use the tokens already determined in step 404 (FIG. 7), or may compute new tokens from text block 38. In the example illustrated in FIG. 10, in a step 424, fingerprint calculator 56 determines a set of aggregate tokens of text block 38. In some embodiments, aggregate tokens, illustrated as item 60d in FIG. 9, are determined by concatenating consecutive individual tokens. The count of tokens used to form aggregate tokens may vary according to the zoom-out factor.

In a step 426, a hash is computed for each aggregate token, for instance using methods described above. In a step 428, calculator 56 selects a subset of aggregate tokens according to a hash selection criterion. In some embodiments, for a zoom-out factor k, the selection criterion requires that all hashes determined for members of the selected subset be equal modulo k. For instance, to determine a 2× zoom-out fingerprint, calculator 56 may only consider aggregate tokens, whose hashes are equal modulo 2 (i.e., odd hashes only, or even hashes only). In some embodiments, the hash selection criterion comprises selecting only tokens whose hashes are divisible by the zoom-out factor k.

In a step 430, fingerprint calculator 56 may check whether the count of tokens selected in step 428 is within the desired range of fingerprint lengths. If no, calculator 56 may return to step 422 and restart with another zoom-out factor k. When the count of selected tokens is within range, in a step 432 calculator 56 determines a fingerprint fragment according to each hash of a selected token. In a step 434, such fragments are assembled to produce fingerprint 42. FIG. 9 illustrates a number of zoom-out fingerprints 42d-h determined for text block 38. Table 2 shows exemplary fingerprint fragments determined for the same text block 38 in FIG. 9, at various zoom-out factors.

determining that document 36 belongs to a sub-category of spam/fraud, such as product offers, phishing or Nigerian fraud. To classify document 36, document classifier 72 may employ any method known in the art, in conjunction with fingerprint comparison. Such methods include black- and whitelisting, and pattern matching algorithms, among others. For instance, document classifier 72 may compute a plurality of individual scores, wherein each score is indicative of a membership of document 36 to a particular document category (e.g., spam), each score determined through a distinct classification method (e.g., fingerprint comparison, blacklisting, etc.). Classifier 72 may then determine the classification of document 36 according to a composite score determined as a combination of the individual scores.

Figure 12:
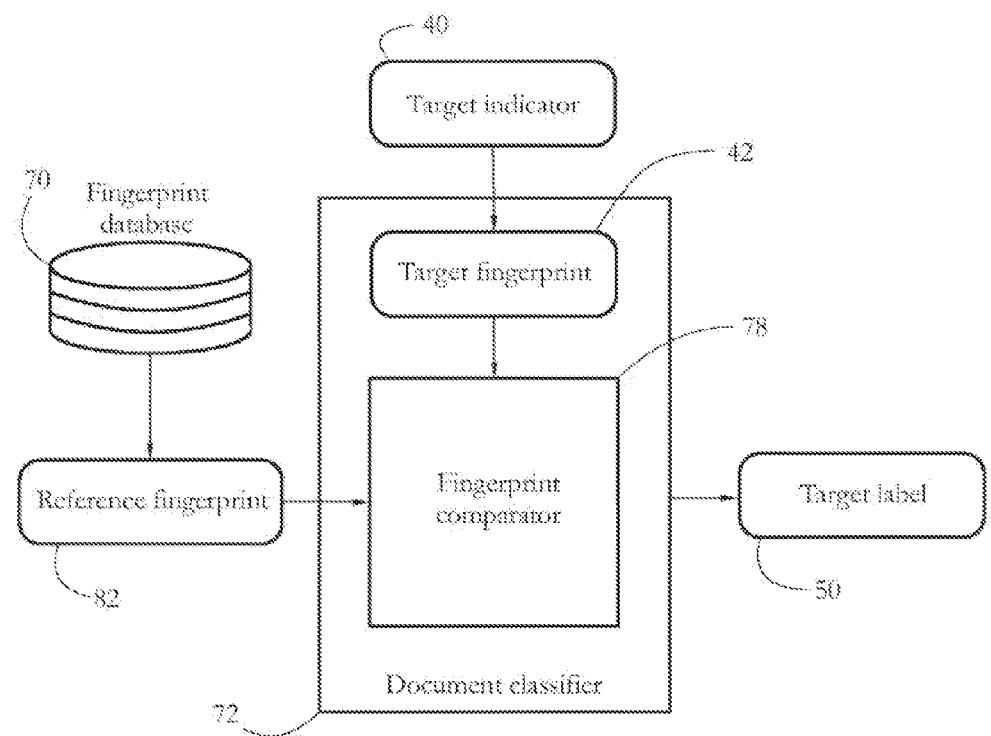
FIG. 12 shows a diagram of an exemplary document classifier executing on the security server according to some embodiments of the present invention.

Document classifier 72 may further comprise a fingerprint comparator 78, as shown in FIG. 12, configured to classify target document 36 by comparing a fingerprint of the target document to a set of reference fingerprints stored in database 70. In some embodiments, fingerprint database 70 comprises a repository of text fingerprints, determined for a set of reference documents, such as email messages, webpages, and website comments, among others. Database 70 may comprise fingerprints of spam/fraud, but also of legitimate documents. For each reference fingerprint, database 70 may store an indicator of an association between the respective fingerprint and a document category (e.g., spam).

In some embodiments, all fingerprints of a subset of reference fingerprints in database 70 have lengths within a prede-

TABLE 2

| aggregate token | hash | zoom-out factor 2 | zoom-out factor 3 | zoom-out factor 4 | zoom-out factor 5 | zoom-out factor 6 |
|---|---|---|---|---|---|---|
| high end designer | 54206878 | 4 | | 4 | 4 | |
| end designer watch | 63514ba5 | | 1 | | 1 | |
| designer watch and | 60acfb49 | | | | | |
| watch and handbag | 73062bc7 | | H | | | |
| and handbag replica | 71486e1c | c | | c | | |
| handbag replica sale | 5c776d2e | u | u | | | u |
| replica sale compare | 5e63573c | 8 | | 8 | 8 | |
| sale compare our | 4fe3444a | K | | | | |
| compare our price | 7ca1596c | s | | s | | |
| our price on | 77849334 | 0 | 0 | 0 | 0 | 0 |
| price on a | 52cc87bd | | | | 9 | |
| on a handful | 4f8398fe | + | | | | |
| a handful of | 4f8398f6 | 2 | | | | |
| handful of our | 743ba46d | | | | | |
| of our high | 7b451587 | | H | | | |
| our high end | 89d97a75 | | | | | |
| high end replicas | 6ff630c6 | G | G | | | G |

Figure 11:
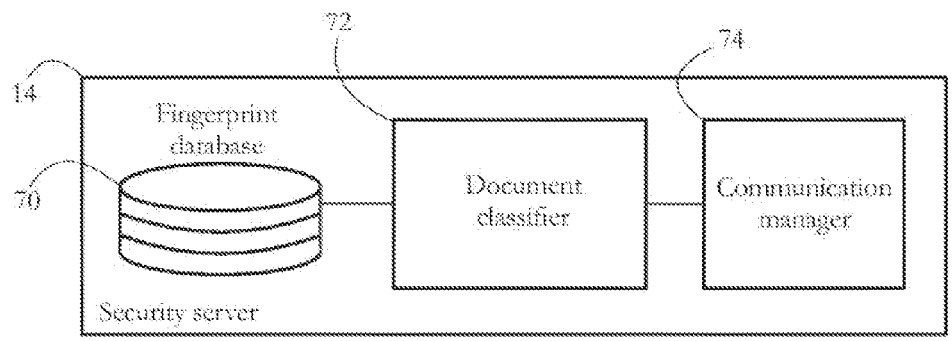
FIG. 11 shows exemplary applications executing on the security server according to some embodiments of the present invention.

FIG. 11 shows exemplary components executing on a security server (see also FIG. 1), according to some embodiments of the present invention. Security server 14 comprises a document classifier 72 connected to a communication manager 74 and to a fingerprint database 70. Communication manager 74 manages spam/fraud-detection transactions with client systems 16a-c, as shown above in relation to FIGS. 4-A-B. In some embodiments, document classifier 72 is configured to receive target indicator 40 via communication manager 74, and to determine target label 50 indicating a classification of target document 36.

In some embodiments, classifying target document 36 comprises assigning document 36 to a document category, according to a comparison between a text fingerprint determined for document 36 and a set of reference fingerprints, each reference fingerprint indicative of a document category. For instance, classifying document 36 may include determining whether document 36 is spam and/or fraudulent, and termined range, e.g., between 129 and 256 characters. Moreover, said range coincides with the range of lengths of target fingerprints determined for target documents by fingerprint calculator 56 (FIG. 6). Such a configuration, wherein all reference fingerprints have approximately the same size, and wherein reference fingerprints have lengths approximately equal to the length of target fingerprints, may facilitate comparison between target and reference fingerprints, for the purpose of document classification.

For each reference fingerprint, some embodiments of database 70 may store an indicator of the length of the text block for which the respective fingerprint was determined. Examples of such indicators include a string length of the respective text block, a fragment length used in determining the respective fingerprint, and a zoom-in/zoom-out factor, among others. Storing an indicator of text block length with each fingerprint may facilitate document comparison, by enabling fingerprint comparator 78 to selectively retrieve reference fingerprints representing text blocks similar in length to the text block generating target fingerprint 42.

To classify target document 36, classifier 72 may receive target indicator 40, extract target fingerprint 42 from indicator 40, and forward fingerprint 42 to fingerprint comparator 78. Comparator 78 may interface with database 70, to selectively retrieve a reference fingerprint 82 for comparison with target fingerprint 42. In some embodiments, fingerprint comparator 78 may preferentially retrieve reference fingerprints computed for text blocks of similar length to the length of the target text block.

Document classifier 72 further determines a classification of target document 42 according to a comparison between target fingerprint 42 and the reference fingerprint retrieved from database 70. In some embodiments, the comparison includes computing a similarity score indicative of a degree of similarity of fingerprints 42 and 82. Such a similarity score may be determined, for instance, as:

$$S = 1 - \frac{2d(f_T, f_R)}{|f_T| + |f_R|} \quad [1]$$

wherein $f_T$ and $f_R$ denote the target and reference fingerprints, respectively, $d(f_T, f_R)$ denotes an edit distance, e.g. Levenshtein distance, between the two fingerprints, and wherein $|f_T|$ and $|f_R|$ denote the length of the target and reference fingerprints, respectively. Score S can take any value between 0 and 1, values close to 1 indicating a high degree of similarity between the two fingerprints. In an exemplary embodiment, target fingerprint 42 is said to match reference fingerprint 82 when score S exceeds a predetermined threshold T. e.g. 0.9. When target fingerprint 42 matches at least one reference fingerprint from database 70, document classifier 72 may classify the target document according to the document category indicator of the respective reference fingerprint, and may formulate target label 50 to reflect the classification. For instance, when target fingerprint 42 matches a reference fingerprint determined for a spam message, target document 36 may be classified as spam, and target label 50 may indicate the spam classification.

The exemplary systems and methods described above allow the detection of unsolicited communication (spam) in electronic messaging systems such as email and user-contributed websites, as well as the detection of fraudulent electronic documents such as phishing websites. In some embodiments, a text fingerprint is calculated for each target document, the fingerprint comprising a sequence of characters determined according to a plurality of text tokens of the respective document. The fingerprint is then compared to reference fingerprints determined for a collection of documents, including spam/fraudulent and legitimate documents. When the target fingerprint matches a reference fingerprint determined for a spam/fraudulent message, the target communication may be labeled as spam/fraud.

When a target communication is positively identified as spam/fraud, components of the anti-spam/anti-fraud system may modify the display of the respective document. For instance, some embodiments may block the display of the respective document (e.g., not allow spam comments to be displayed on a website), may display the respective document in a separate location (e.g., a spam email folder, a separate browser window), and/or may display an alert.

In some embodiments, text tokens include individual words or word sequences of the target document, as well as email addresses and/or network addresses such as uniform resource locators (URL) included in a text portion of the target document. Some embodiments of the present invention identify a plurality of such text tokens within the target document. A hash is computed for each token, and a fingerprint fragment is determined according to the respective hash. In some embodiments, fingerprint fragments are then assembled by e.g. concatenation to produce the text fingerprint of the respective document.

Some electronic documents, such as email messages, may vary greatly in length. In some conventional anti-spam/anti-fraud systems, the length of a fingerprint determined for such documents varies accordingly. By contrast, in some embodiments of the present invention, the length of the text fingerprint is constrained within a pre-determined range of lengths, for instance between 129 and 256 characters, irrespective of the length of the target text block or document. Having all text fingerprints within pre-determined length bounds may substantially improve the efficiency of inter-message comparison.

To determine fingerprints within a pre-determined range of lengths, some embodiments of the present invention employ zoom-in and zoom-out methods. When a text block is relatively short, zooming in is obtained by adjusting the length of fingerprint fragments to produce a fingerprint of the desired length. In an exemplary embodiment, every 6 bits of a 30-bit hash may be converted into a character (using e.g. a Base64 representation), so the respective hash may generate a fingerprint fragment between 1 and 5 characters long.

For relatively long text blocks, some embodiments of the present invention achieve a zoom-out by computing the fingerprint from a subset of tokens, the subset chosen according to a hash selection criterion. An exemplary hash selection criterion comprises choosing only tokens, whose hashes are divisible by an integer k, such as 2, 3, or 6. For the given example, such a selection results in computing the fingerprint from approximately ½, ⅓, or ⅙ of the available tokens, respectively. In some embodiments, zooming out may further comprise applying such token selection to a plurality of aggregate tokens, wherein each aggregate token comprises a concatenation of several tokens, such as a sequence of words of the respective electronic document.

Various hash functions may be used in the determination of fingerprint fragments. In a computer experiment, various hash functions known in the art were applied to a collection of 122,000 words extracted from email messages in various languages, with the purpose of determining the number of hash collisions (distinct words producing identical hashes) that each hash function may generate in actual spam. Results illustrated in Table 3 show that the hash function known in the art as RSHash produces the fewest collisions of all tested hash functions.

TABLE 3

| Hash function | 32-bit hash collisions | 30-bit hash collisions |
| --- | --- | --- |
| RSHash | 0 | 4 |
| BKDRHash | 1 | 6 |
| SDBMHash | 2 | 7 |
| OneAtATimeHash | 2 | 6 |
| APHash | 4 | 6 |
| FNVHash | 7 | 10 |
| FNV1aHash | 7 | 10 |
| JSHash | 266 | 277 |
| DJBHash | 266 | 268 |
| DEKHash | 435 | 720 |
| PJWHash | 1687 | 1687 |

TABLE 3-continued

| Hash function | 32-bit hash collisions | 30-bit hash collisions |
|---|---|---|
| ELFHash | 1687 | 1687 |
| BPHash | 61907 | 70909 |

In another computer experiment, a collection of email messages consisting of the total amount of email received during one week at a corporate server, and comprising both spam and legitimate messages, was analyzed using some embodiments of the present invention. To determine text fingerprints between 129 and 256 characters long, 20.8% of messages required no zooming, 18.5% required a 2× zoom-out, 8.1% required a 3× zoom-out, and 8.7% required a 6× zoom-out. Of the same collection of messages, 14.8% required a 2× zoom-in, 9.7% required a 4× zoom-in, and 11.7% a 8× zoom-in. The above results suggest that a fingerprint length between 129-256 characters may be optimal for detecting email spam, since the above-mentioned partitioning of a real stream of email into groups according to the zoom-in and/or zoom-out factor produces relatively uniformly populated groups; such a situation is advantageous for fingerprint comparison, since all groups may be searched in approximately equal time.

Figure 13:
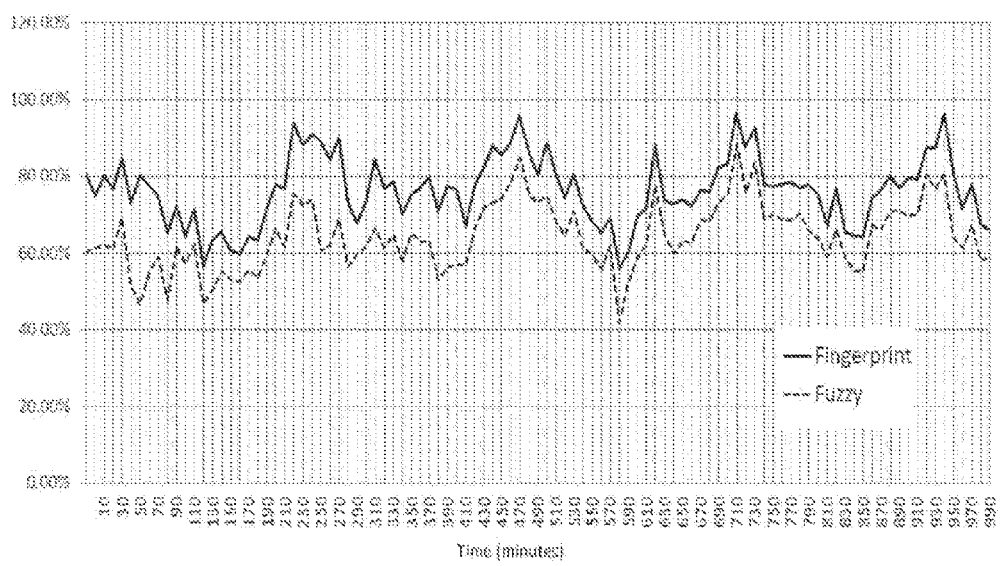
FIG. 13 shows a spam detection rate obtained in a computer experiment comprising analyzing a stream of actual spam messages, the analysis performed according to some embodiments of the present invention; said detection rate is compared to a detection rate obtained by conventional methods.

In yet another computer experiment, a continuous stream of spam, consisting of approximately 865,000 messages collected over 15 hours, was divided into sets of messages, each set consisting of messages received during a distinct 10 minute interval. Each set of messages was analyzed using a document classifier constructed according to some embodiments of the present invention (see e.g., FIGS. 11-12). For each set of messages, fingerprint database 70 consisted of fingerprints determined for spam messages belonging to earlier time intervals. The spam detection rate obtained using Eq. [1] and a threshold T=0.75 is shown in FIG. 13 (solid line), compared to a spam detection rate obtained on the same sets of messages using a conventional spam-detection method, known in the art as fuzzy hashing (dashed line).

It will be clear to one skilled in the art that the above embodiments may be altered in many ways without departing from the scope of the invention. Accordingly, the scope of the invention should be determined by the following claims and their legal equivalents.

What is claimed is:

1. A computer system comprising at least one processor configured to:
   determine a text fingerprint of a target electronic document so that a length of the text fingerprint is constrained between a lower bound and an upper bound, wherein the lower and upper bounds are predetermined; and
   classify the target electronic document as belonging to a selected category of documents according to a label determined for the target electronic document,
   wherein determining the text fingerprint comprises:
      selecting a plurality of text tokens of the target electronic document;
      in response to selecting the plurality of text tokens, determining a fingerprint fragment size according to the upper and lower bounds, and according to a count of the selected plurality of text tokens;
      determining a plurality of fingerprint fragments, each fingerprint fragment of the plurality of fingerprint fragments determined according to a hash of a distinct text token of the selected plurality of text tokens, each fingerprint fragment consisting of a sequence of characters, a length of the sequence chosen to equal the fingerprint fragment size; and
      concatenating the plurality of fingerprint fragments to form the text fingerprint,
   and wherein determining the label comprises:
      retrieving a reference fingerprint from a database of reference fingerprints, the reference fingerprint determined for a reference electronic document belonging to the selected category, the reference fingerprint selected according to a length of the reference fingerprint so that the length of the reference fingerprint is between the upper and lower bounds; and
      determining the label according to a result of comparing the text fingerprint to the reference fingerprint.

2. The client computer system of claim 1, wherein the at least one processor is further configured to:
   send the text fingerprint to a server computer system; and
   in response, receive the label from the server computer system.

3. The computer system of claim 1, wherein the selected category of documents is a spam category.

4. The computer system of claim 1, wherein the selected category of documents is a fraudulent document category.

5. The computer system of claim 1, wherein determining the text fingerprint further comprises determining each character of the sequence of characters according to a distinct group of bits of the hash of the distinct text token.

6. The computer system of claim 1, wherein selecting the plurality of text tokens comprises:
   selecting a preliminary plurality of text tokens from the target electronic document,
   determining a count of the preliminary plurality of text tokens, and
   in response, when the count of the preliminary plurality of text tokens exceeds a predetermined threshold, prune the preliminary plurality of text tokens to form the selected plurality of text tokens, wherein pruning the preliminary plurality of text tokens comprises selecting a target text token of the preliminary plurality of text tokens into the selected plurality of text tokens according to a hash of the target text token.

7. The computer system of claim 6, wherein pruning the preliminary plurality of text tokens further comprises:
   determining whether the hash of the target text token is divisible by a zoom-out factor; and
   in response, when the target text token is divisible by the zoom-out factor, selecting the target text token into the selected plurality of text tokens.

8. The computer system of claim 1, wherein selecting the plurality of text tokens comprises:
   selecting a preliminary plurality of text tokens of the target electronic document;
   determining a count of the preliminary plurality of text tokens; and
   in response, when the count of the preliminary plurality of text tokens exceeds a predetermined threshold,
   determine a plurality of aggregate text tokens, each aggregate text token of the plurality of aggregate text tokens comprising a concatenation of a set of text tokens of the preliminary plurality of text tokens; and
   selecting an aggregate token of the plurality of aggregate tokens into the selected plurality of text tokens according to a hash of the aggregate text token.

9. The computer system of claim 1, wherein the target electronic document is selected from a group consisting of an email message and a hypertext markup language (HTML) document.

10. The computer system of claim 1, wherein the distinct text token comprises an item selected from a group consisting of a word, an email address, and a uniform resource locator (URL) of the target electronic communication.

11. A server computer system comprising at least one processor configured to perform transactions with a plurality of client systems, wherein a transaction comprises:
  receiving a text fingerprint from a client system of the plurality of client systems, the text fingerprint determined for a target electronic document so that a length of the text fingerprint is constrained between a lower bound and an upper bound, wherein the lower and upper bounds are predetermined; and
  sending to the client system a target label indicative of a category of documents that the target electronic document belongs to,
  wherein determining the text fingerprint comprises:
    selecting a plurality of text tokens of the target electronic document;
    in response to selecting the plurality of text tokens, determining a fingerprint fragment size according to the upper and lower bounds, and according to a count of the selected plurality of text tokens;
    determining a plurality of fingerprint fragments, each fingerprint fragment of the plurality of fingerprint fragments determined according to a hash of a distinct text token of the selected plurality of text tokens, each fingerprint fragment consisting of a sequence of characters, a length of the sequence chosen to equal the fingerprint fragment size; and
    concatenating the plurality of fingerprint fragments to form the text fingerprint,
  and wherein determining the target label comprises:
    retrieving a reference fingerprint from a database of reference fingerprints, the reference fingerprint determined for a reference electronic document belonging to the category, the reference fingerprint selected according to a length of the reference fingerprint so that the length of the reference fingerprint is between the upper and lower bounds; and
    determining whether the target electronic document belongs to the category according to a result of comparing the text fingerprint to the reference fingerprint.

12. The server computer system of claim 11, wherein the category of documents is a spam category.

13. The server computer system of claim 11, wherein the category of documents is a fraudulent document category.

14. The server computer system of claim 11, wherein determining the text fingerprint further comprises determining each character of the sequence of characters according to a distinct group of bits of the hash of the distinct text token.

15. The server computer system of claim 11, wherein selecting the plurality of text tokens comprises:
  selecting a preliminary plurality of text tokens from the target electronic document,
  determining a count of the preliminary plurality of text tokens, and
  in response, when the count of the preliminary plurality of text tokens exceeds a predetermined threshold, prune the preliminary plurality of text tokens to form the selected plurality of text tokens wherein pruning the preliminary plurality of text tokens comprises selecting a target text token of the preliminary plurality of text tokens into the selected plurality of text tokens according to a hash of the target text token.

16. The server computer system of claim 15, wherein pruning the preliminary plurality of text tokens further comprises:
  determining whether the hash of the target text token is divisible by a zoom-out factor; and
  in response, when the target text token is divisible by the zoom-out factor, selecting the target text token into the selected plurality of text tokens.

17. The server computer system of claim 11, wherein selecting the plurality of text tokens comprises:
  selecting a preliminary plurality of text tokens of the target electronic document;
  determining a count of the preliminary plurality of text tokens; and
  in response, when the count of the preliminary plurality of text tokens exceeds a predetermined threshold,
  determine a plurality of aggregate text tokens, each aggregate text token of the plurality of aggregate text tokens comprising a concatenation of a set of text tokens of the preliminary plurality of text tokens; and
  selecting an aggregate token of the plurality of aggregate tokens into the selected plurality of text tokens according to a hash of the aggregate text token.

18. The server computer system of claim 11, wherein the target electronic document is selected from a group consisting of an email message and a hypertext markup language (HTML) document.

19. The server computer system of claim 11, wherein the distinct text token comprises an item selected from a group consisting of a word, an email address, and a uniform resource locator (URL) of the target electronic communication.

20. A method comprising employing at least one processor of a computer system to:
  1. determine a text fingerprint of a target electronic document so that a length of the text fingerprint is constrained between a lower bound and an upper bound, wherein the lower and upper bounds are predetermined; and
  classify the target electronic document as belonging to a selected category of documents according to a label determined for the target electronic document,
  wherein determining the text fingerprint comprises:
    selecting a plurality of text tokens of the target electronic document;
    in response to selecting the plurality of text tokens, determining a fingerprint fragment size according to the upper and lower bounds, and according to a count of the selected plurality of text tokens;
    determining a plurality of fingerprint fragments, each fingerprint fragment of the plurality of fingerprint fragments determined according to a hash of a distinct text token of the selected plurality of text tokens, each fingerprint fragment consisting of a sequence of characters, a length of the sequence chosen to equal the fingerprint fragment size; and
    concatenating the plurality of fingerprint fragments to form the text fingerprint,
  and wherein determining the label comprises:
    retrieving a reference fingerprint from a database of reference fingerprints, the reference fingerprint determined for a reference electronic document belonging to the selected category, the reference fingerprint selected according to a length of the reference fingerprint so that the length of the reference fingerprint is between the upper and lower bounds; and
    determining the label according to a result of comparing the text fingerprint to the reference fingerprint.

21. The method of claim 20, further comprising employing the at least one processor to determine a category of documents that the target electronic document belongs to according to the text fingerprint.

22. A method comprising employing at least one processor of a server computer system configured to perform transactions with a plurality of client systems, to:
receive a text fingerprint from a client system of the plurality of client systems, the text fingerprint determined for a target electronic document so that a length of the text fingerprint is constrained between a lower bound and an upper bound, wherein the lower and upper bounds are predetermined; and
send to the client system a target label determined for the target electronic document, the target label indicating a category of documents that the target electronic document belongs to,
wherein determining the text fingerprint comprises:
selecting a plurality of text tokens of the target electronic document;
in response to selecting the plurality of text tokens, determining a fingerprint fragment size according to the upper and lower bounds, and according to a count of the selected plurality of text tokens;
determining a plurality of fingerprint fragments, each fingerprint fragment of the plurality of fingerprint fragments determined according to a hash of a distinct text token of the selected plurality of text tokens, each fingerprint fragment consisting of a sequence of characters, a length of the sequence chosen to equal the fingerprint fragment size; and
concatenating the plurality of fingerprint fragments to form the text fingerprint,
and wherein determining the target label comprises:
retrieving a reference fingerprint from a database of reference fingerprints, the reference fingerprint determined for a reference electronic document belonging to the category, the reference fingerprint selected according to a length of the reference fingerprint so that the length of the reference fingerprint is between the upper and lower bounds; and
determining whether the target electronic document belongs to the category according to a result of comparing the text fingerprint to the reference fingerprint.

\* \* \* \* \*